US008963952B2

(12) United States Patent
Nakamori

(10) Patent No.: US 8,963,952 B2
(45) Date of Patent: Feb. 24, 2015

(54) DISPLAY CONTROL SYSTEM, CORRECTED DISPLAY INFORMATION OUTPUT METHOD AND COMPUTER READABLE MEDIUM

(75) Inventor: Yuki Nakamori, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 697 days.

(21) Appl. No.: 12/834,236

(22) Filed: Jul. 12, 2010

(65) Prior Publication Data

US 2011/0080426 A1    Apr. 7, 2011

(30) Foreign Application Priority Data

Oct. 2, 2009  (JP) ................................. 2009-230924
Mar. 24, 2010  (JP) ................................. 2010-068827

(51) Int. Cl.
*G09G 5/00* (2006.01)
*G06F 15/16* (2006.01)
(Continued)

(52) U.S. Cl.
CPC ............ *H04N 1/00153* (2013.01); *G06F 9/526* (2013.01); *G06F 21/6218* (2013.01);
(Continued)

(58) Field of Classification Search
CPC ..................... G06F 21/6218; G06F 2221/2149; G06F 3/1454; G06F 21/6245; G06F 9/526; H04N 1/00132; H04N 1/00153; H04N 1/00159; G09G 2370/027
USPC ................. 345/629–634; 726/6, 26; 709/203; 358/1.18; 705/57
See application file for complete search history.

(56) References Cited

U.S. PATENT DOCUMENTS 8,171,557 B2 * 5/2012 Jones et al. ..................... 726/26
2003/0105719 A1 * 6/2003 Berger et al. .................. 705/51
(Continued)

FOREIGN PATENT DOCUMENTS

CN    101416173 A    4/2009
JP    9-214618 A    8/1997
(Continued)

OTHER PUBLICATIONS

Office Action, dated Mar. 5, 2014, issued by the State Intellectual Property Office of the People's Republic of China in counterpart Chinese Application No. 201010230705.4

*Primary Examiner* — Jin-Cheng Wang
(74) *Attorney, Agent, or Firm* — Sughrue Mion, PLLC

(57) ABSTRACT

A display control system includes: a display information acquisition section that acquires display information by using given account information; and a corrected display information creation section that, based on first display information acquired by the display information acquisition section using first account information and second display information acquired by the display information acquisition section using second account information different from the first account information, determines whether the display contents shown by the first display information are included in display contents shown by the second display information or not, selects part or all of the display contents shown by the first display information in accordance with a result of the determination, and creates corrected display information which includes the selected part of the display contents shown by the first display information.

9 Claims, 26 Drawing Sheets

(51) Int. Cl.
*H04N 1/00* (2006.01)
*G06F 9/52* (2006.01)
*G06F 21/62* (2013.01)
*G09G 3/00* (2006.01)
*G06F 3/14* (2006.01)

(52) U.S. Cl.
CPC ........ *H04N1/00159* (2013.01); *G06F 21/6245* (2013.01); *G09G 3/007* (2013.01); *G06F 3/1454* (2013.01); *G06F 2221/2149* (2013.01); *G09G 2370/027* (2013.01); *H04N 1/00132* (2013.01)
USPC ........... 345/629; 345/632; 345/633; 345/634; 726/6; 726/26; 726/27; 726/28; 726/29; 709/201; 709/202; 709/203; 358/1.18; 705/51; 705/52; 705/53; 705/54; 705/57

(56) References Cited

U.S. PATENT DOCUMENTS

| | | | |
|---|---|---|---|
| 2003/0208562 A1* | 11/2003 | Hauck et al. | 709/219 |
| 2005/0177050 A1* | 8/2005 | Cohen | 600/509 |
| 2007/0009230 A1* | 1/2007 | Tanaka | 386/94 |
| 2007/0223038 A1* | 9/2007 | Sato | 358/1.18 |
| 2007/0271212 A1* | 11/2007 | Jones et al. | 707/1 |
| 2007/0282752 A1 | 12/2007 | Jones et al. | |
| 2008/0052514 A1* | 2/2008 | Nakae | 713/168 |
| 2008/0091761 A1* | 4/2008 | Tsao | 709/201 |
| 2008/0177821 A1* | 7/2008 | Tsao | 709/201 |
| 2008/0184348 A1* | 7/2008 | Tanaka | 726/6 |
| 2008/0189617 A1* | 8/2008 | Covell et al. | 715/738 |
| 2008/0222734 A1* | 9/2008 | Redlich et al. | 726/26 |
| 2008/0243698 A1* | 10/2008 | Tanaka | 705/57 |
| 2009/0013027 A1* | 1/2009 | Tanaka | 709/203 |
| 2009/0113560 A1* | 4/2009 | Kori et al. | 726/29 |
| 2010/0169363 A1* | 7/2010 | Gaedcke | 707/769 |
| 2012/0030187 A1* | 2/2012 | Marano et al. | 707/709 |

FOREIGN PATENT DOCUMENTS

| | | |
|---|---|---|
| JP | 2004-110681 A | 4/2004 |
| WO | 2007/123785 A2 | 11/2007 |

\* cited by examiner

US 8,963,952 B2

DISPLAY CONTROL SYSTEM, CORRECTED DISPLAY INFORMATION OUTPUT METHOD AND COMPUTER READABLE MEDIUM

CROSS-REFERENCE TO RELATED APPLICATIONS

This application is based on and claims priority under 35 USC 119 from Japanese Patent Applications Nos. 2009-230924 filed on Oct. 2, 2009 and 2010-068827 filed on Mar. 24, 2010.

BACKGROUND

Technical Field

The present invention relates to a display control system, a corrected display information output method and a computer readable medium.

SUMMARY

According to an aspect of the invention, a display control system includes a display information acquisition section and a corrected display information creation section. The display information acquisition section acquires display information by using given account information so that the display information includes information directed to a user concerned with the given account information, and information directed to users including the user concerned with the given account information. The corrected display information creation section, based on first display information acquired by the display information acquisition section using first account information and second display information acquired by the display information acquisition section using second account information different from the first account information, (i) determines whether the display contents shown by the first display information are included in display contents shown by the second display information or not, (ii) selects part or all of the display contents shown by the first display information in accordance with a result of the determination, and (iii) creates corrected display information which includes the selected part of the display contents shown by the first display information.

BRIEF DESCRIPTION OF THE DRAWINGS

Exemplary embodiment(s) of the present invention will be described in detail based on the following figures, wherein.

DETAILED DESCRIPTION

Exemplary embodiments of the invention will be described below in detail with reference to the drawings.

Figure 1:
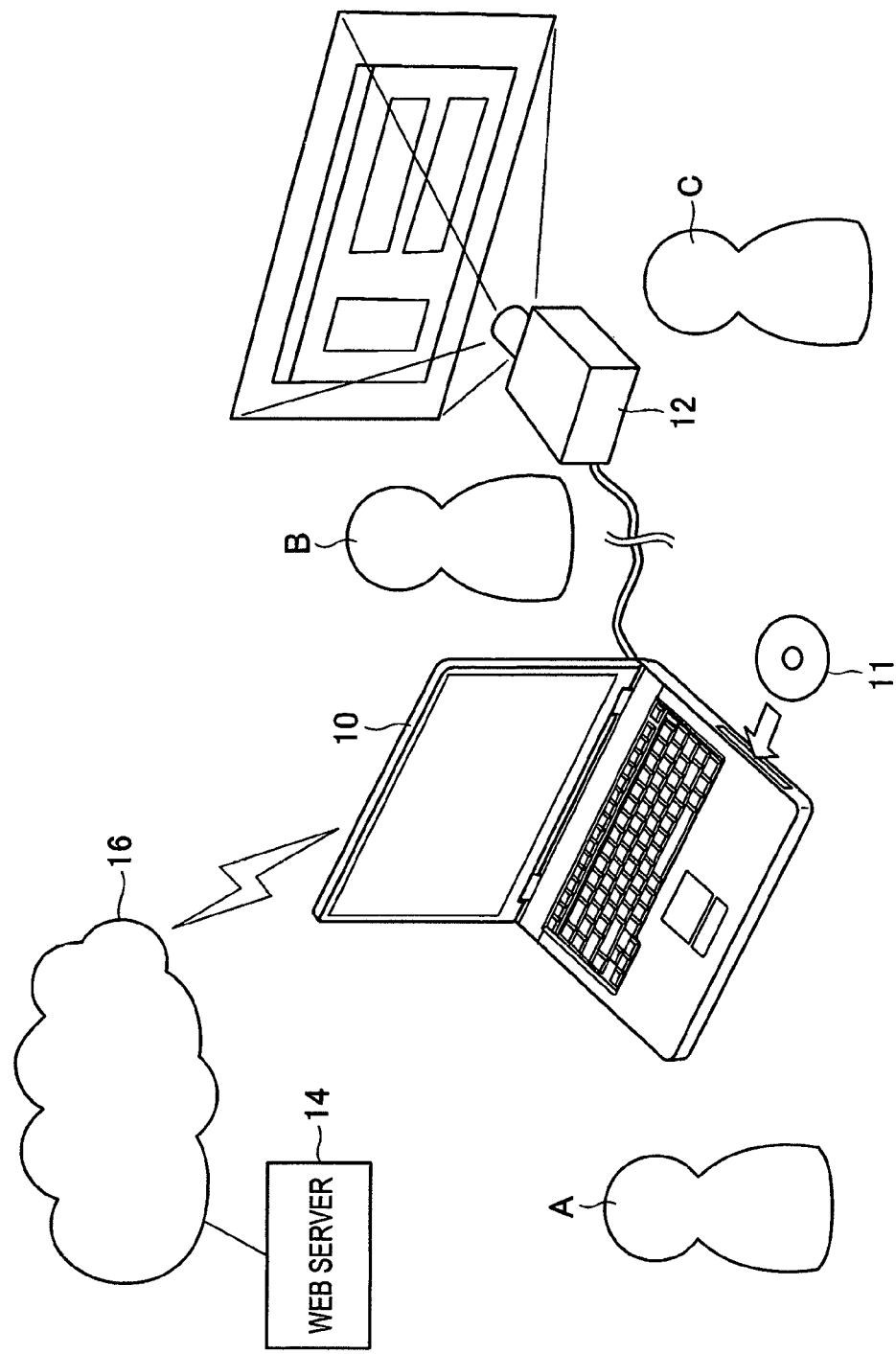
FIG. 1 is a perspective view showing the external appearance of a display control system according to an exemplary embodiment of the invention.

FIG. 1 is a perspective view showing the external appearance of a display control system according to an exemplary embodiment of the invention. The display control system includes a computer 10, and a projector 12 which projects a display output of the computer 10. For example, the computer 10 and the projector 12 are set up in a conference room of an enterprise. Not only a user A operating the computer 10 but also a user B and a user C are present in the conference room. The computer 10 is connected to a network 16 such as Internet or Intranet by wire or wireless, so that the computer 10 receives Web page information provided from a Web server 14 on the network 16 and displays display contents on a screen of the computer 10. The projector 12 displays the same display contents on a surface of protection such as a wall. Accordingly, the display contents catch not only the eyes of the user A operating the computer 10 but also the eyes of the users B and C.

The Web server 14 is a so-called ASP (Application Service Provider) server by which Web page information dynamically created for a user having an account registered in advance is transmitted to the user. That is, when the computer 10 transmits account information including a user ID and a true password to the Web server 14, the Web server 14 creates Web page information corresponding to the user ID dynamically and sends the Web page information back to the computer 10. The user ID or information equivalent to the user ID is transmitted, for example, as a cookie or an argument of URL from the computer 10 to the Web server 14. The Web page information includes any one of a personal message such as a mail addressed to a user, a specific attribute users-directed message such as notice information or a mail addressed to persons having the same attribute (e.g. the same post) as the user and an all users-directed message. That is, Web page information transmitted so as to be addressed to each user includes any one of a personal message corresponding to the user ID, a specific attribute users-directed message corresponding to the user ID and an all users-directed massage. For this reason, even when display contents are obtained by accessing the same URL, at least part of the display contents can vary according to users.

Figure 2A:
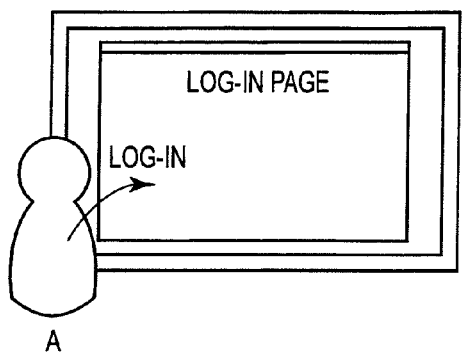
FIGS. 2A to 2F are views for explaining scenes used in the display control system according to the exemplary embodiment of the invention.
Figure 2B:
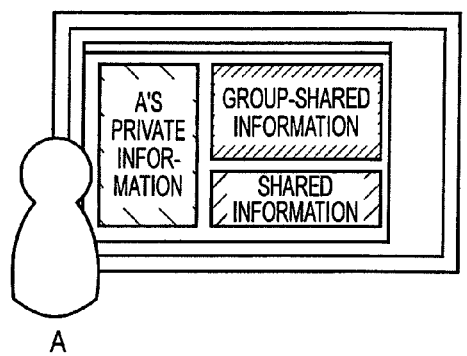
Figure 2C:
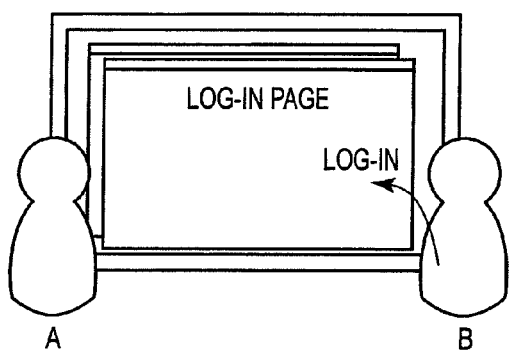
Figure 2D:
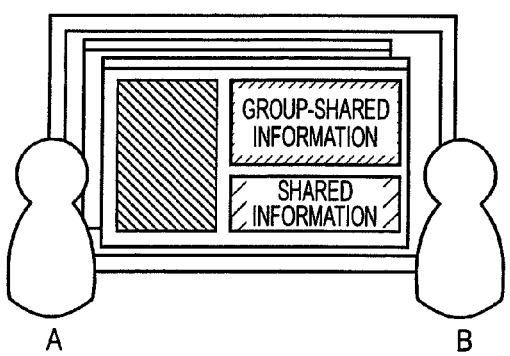

By the display control system according to this exemplary embodiment, display contents displayed on the screen of the computer 10 or on the surface of projection vary practically based on comparison of Web page information transmitted from the Web server 14 to users A, B and C respectively. FIGS. 2A to 2F are views for explaining this situation. First, the user A inputs a URL (Uniform Resource Locator) of a log-in page to the computer 10 by using an input unit such as a keyboard, and receives Web page information from the Web server 14 so that the log-in page indicated by the Web page information is displayed on the screen of the computer 10 or on the surface of projection. Then, as shown in FIG. 2A, the user A enters user A's own account information in a designated place in the log-in page. The account information is transmitted to the Web server 14. As soon as the Web server 14 confirms that the account information is true, the Web server 14 returns user A-directed Web page information. Then, user A-directed display contents are displayed on the screen of the computer 10, and the same display contents are displayed on the surface of projection as shown in FIG. 2B. When the user B belonging to the same group as the user A then comes into the conference room in which the display control system has been set up, the user A cancels display of user A-directed display contents so that the log-in page is displayed on the screen of the computer 10 and on the surface of projection again. Then, as shown in FIG. 2C, the user B enters user B's own account information in a designated place in the log-in page. The account information is transmitted to the Web server 14. As soon as the Web server 14 confirms that the account information is true, the Web server 14 returns user B-directed Web page information. The computer 10 does not display user B-directed Web page information but displays only display contents indicated by user A-directed Web page information and also included in display contents indicated by user B-directed Web page information, on the screen and on the surface of projection instead, as shown in FIG. 2D. For example, as shown in FIGS. 2B and 2D, user A-directed information "A's private information" (such as a reception mail list) is not included in display contents indicated by user B-directed Web page information. Accordingly, display contents indicated by the user A-directed information "A's private information" are not displayed on the screen of the computer and on the surface of projection but an alternate image (such as a special color image) is displayed. On the other hand, "group-shared information" included in user A-directed display contents is also included in user B-directed display contents because the users A and B belong to the same group. Accordingly, the "group-shared information" is displayed on the screen of the computer and on the surface of projection. All users-directed information "shared information" is also displayed on the screen of the computer and on the surface of projection.

Figure 2E:
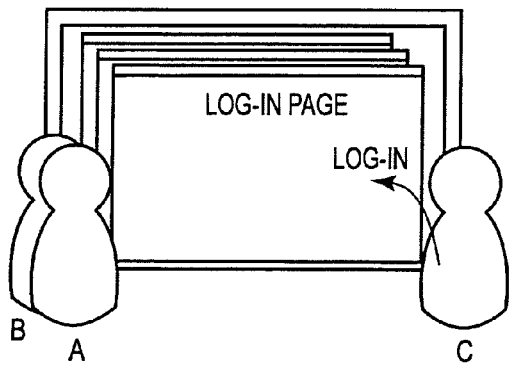
Figure 2F:
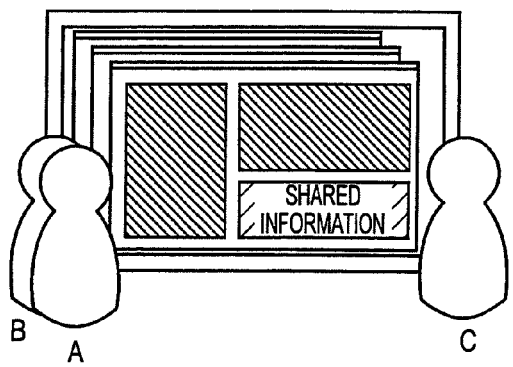

When a user C belonging to another group than the user A further comes into the conference room, the user A cancels display of partly non-displayed user A-directed display contents so that the log-in page is displayed on the screen of the computer 10 and on the surface of projection again. Then, as shown in FIG. 2E, the user C enters user C's own account information into a designated place in the log-in page. The account information is transmitted to the Web server 14. As soon as the Web server 14 confirms that the account information is true, the Web server 14 returns user C-directed Web page information to the computer 10. The computer 10 does not display user C-directed Web page information but displays only user A-directed Web page information also included in both user B-directed Web page information and user C-directed Web page information, on the screen and on the surface of projection instead, as shown in FIG. 2F. In the example shown in FIG. 2F, "group-shared information" included in user A-directed display contents is not included in display contents directed to the user C belonging to the different group. Accordingly, only all users-directed information "shared information" is displayed on the screen of the computer and on the surface of projection. Alternate images are displayed in place of "A's private information" and "group-shared information".

Figure 3:
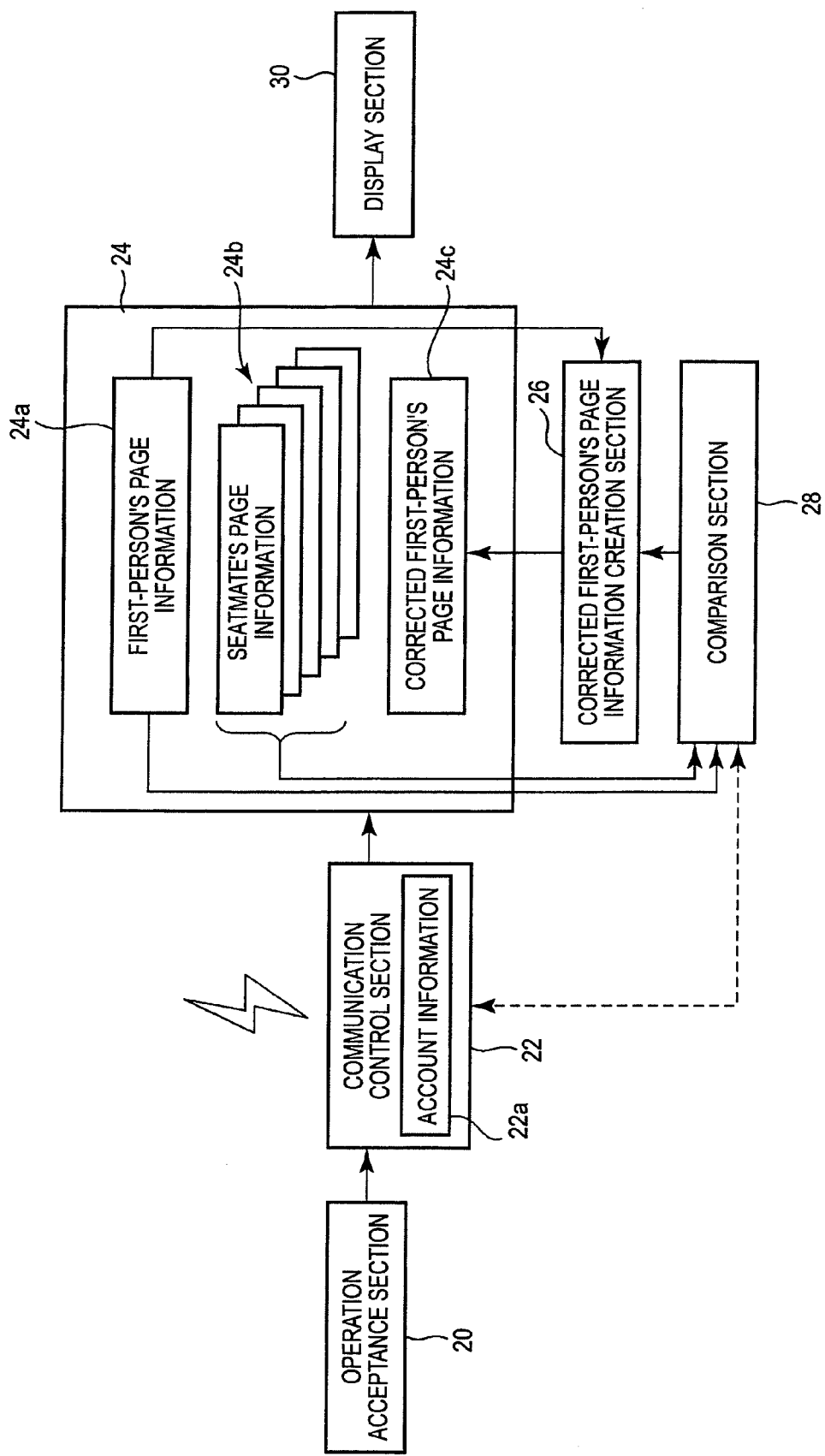
FIG. 3 is a functional block diagram of a computer which executes a display control program according to an exemplary embodiment of the invention.

FIG. 3 is a functional block diagram of the computer 10. The computer 10 is a general-purpose computer which includes a CPU, a memory, a keyboard, a display screen, a network interface, etc. Respective functions shown in FIG. 3 are achieved when the computer 10 executes a display control program according to this exemplary embodiment. The display control program may be stored in a computer-readable information storage medium 11 (see FIG. 1) such as a CD-ROM or a DVD-ROM so that the display control program can be installed in the computer 10 through the medium 11. Alternatively, the display control program may be downloaded from another computer on the network 16.

The computer 10 which executes the display control program functionally includes an operation acceptance section 20, a communication control section 22, a storage section 24, a corrected first-person's page information creation section 26, a comparison section 28, and a display section 30. The operation acceptance section 20 has input units such as a keyboard of the computer 10, a mouse, etc. as main components. The operation acceptance section 20 accepts a URL of a Web page and accepts account information inputted by each user. The accepted URL of the Web page may be typed on the keyboard or may be a URL associated with a button of the Web page clicked with a pointing device such as a mouse. The communication control section 22 transmits the URL accepted by the operation acceptance section 20 to the network 16 and receives Web page information from the Web server 14. Incidentally, the Web page information is created in the form of a structured document such as HTML (Hyper Text Markup Language). The communication control section 22 includes an account information storage section 22a which stores account information of each user accepted by the operation acceptance section 20. When the URL is transmitted to the network 16, the account information stored in the account information storage section 22a is also transmitted as a cookie or an argument of the URL.

For example, the storage section 24 is made of a hard disk storage device built in the computer 10. The storage section 24 includes a first-person's page information storage section 24a, a seatmate's page information storage section 24b, and a corrected first-person's page information storage section 24c. The first-person's page information storage section 24a stores Web page information directed to the user (first person, that is, user A in FIG. 1 and FIGS. 2A to 2F) operating the computer 10 (first-person's page information). The first-person's page information is acquired from the Web server 14 when the communication control section 22 accesses the Web server 14 by using the account information of the user. Incidentally, upon reception of the first-person's page information from the Web server 14, the communication control section 22 further acquires contents such as text or images from another computer such as the Web server 14 on the network 16 in accordance with an instruction written in the first-person's page information. These contents are also included in first-person's page information.

In addition, the seatmate's page information storage section 24b stores Web page information directed to users (seatmates, that is, user B and user C in FIG. 1 and FIGS. 2A to 2F) other than the user operating the computer 10 (seatmate's page information), in accordance with the users. The seatmate's page information is also acquired from the Web server 14 when the communication control section 22 accesses the Web server 14 by using the account information of each of the users. Incidentally, upon reception of the seatmate's page information from the Web server 14, the communication control section 22 further acquires contents such as text or images from another computer such as the Web server 14 on the network 16 in accordance with an instruction written in the first-person's page information. These contents are also included in seatmate's page information.

Whenever any link button included in the Web page displayed on the screen of the computer is clicked, the communication control section 22 accesses a URL corresponding to the button by using the first-person's account information. Then, contents stored in the first-person's page information storage section 24a are updated based on the acquired first-person's page information. Successively, the communication control section 22 accesses the same URL by using each piece of account information stored in the account information storage section 22a. Respective contents stored in the respective seatmate's page information storage section 24b are updated based on the acquired seatmate's page information.

The comparison section 28 compares the first-person's page information stored in the first-person's page information storage section 24a with the respective seatmate's page information stored in the seatmate's page information storage section 24b. The corrected first-person's page information creation section 26 creates data for displaying alternate images in place of part or all of the first-person's page information in accordance with a result of the comparison between the first-person's page information stored in the first-person's page information storage section 24a and the respective seatmate's page information stored in the seatmate's page information storage section 24b. The data may be created in the form of Web page information or may be created in the form of image data. The corrected first-person's page information storage section 24c stores the data created thus.

The display section 30 interprets the Web page information stored in the storage section 24 so that display contents indicated by the Web page information are displayed on the screen provided in the computer 10. Specifically, when a URL of a log-in page is inputted into the computer 10, the log-in page is displayed. When there is no seatmate's page information stored in the seatmate's page information storage section 24b, first-person-directed display contents are displayed based on the first-person's page information stored in the first-person's page information storage section 24a. On the other hand, when there is any seatmate's page information stored in the seatmate's page information storage section 24b, corrected first-person-directed display contents are displayed based on the data stored in the corrected first-person's page information storage section 24c.

Incidentally, an existing Web browser program may be applied to part of the display control program according to this exemplary embodiment for accepting entry of URL and account information, receiving Web page information and relevant contents from another computer such as the Web server 14 based on the information and displaying display contents on the screen.

Figure 4:
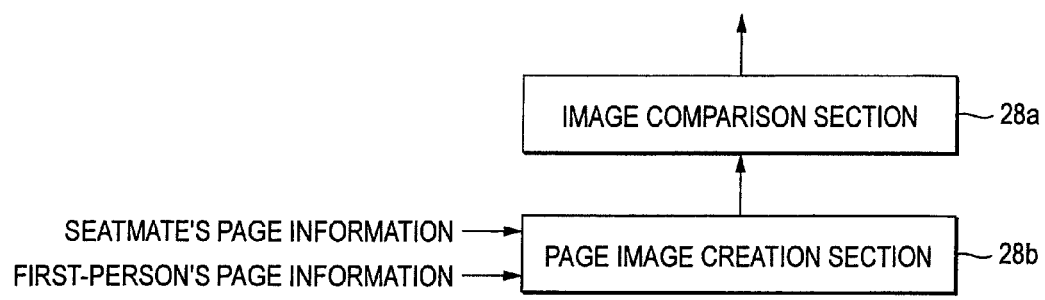
FIG. 4 is a diagram showing a first configuration example of a comparison section.
Figure 5A:
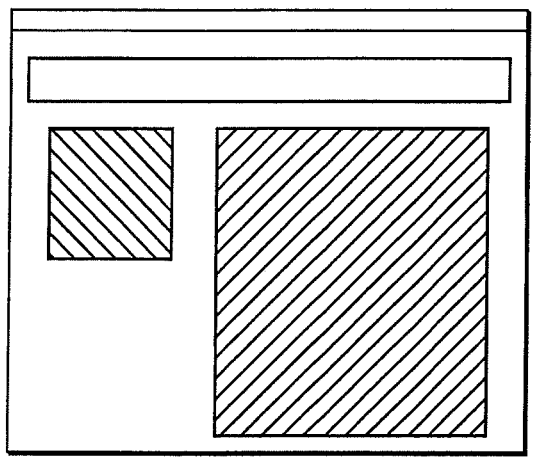
FIGS. 5A to 5C are views for explaining display control based on the first configuration example.
Figure 5B:
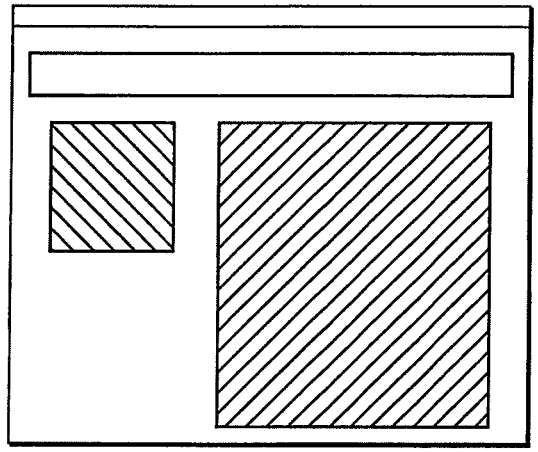
Figure 5C:
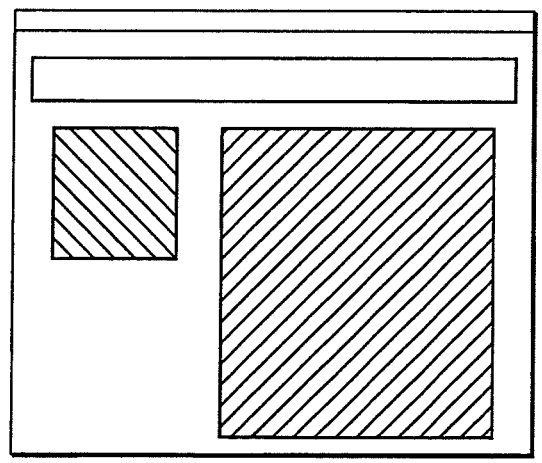
Figure 6A:
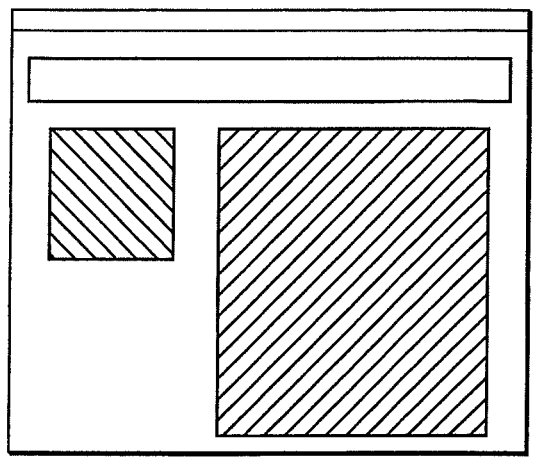
FIGS. 6A to 6C are views for explaining display control based on the first configuration example.
Figure 6B:
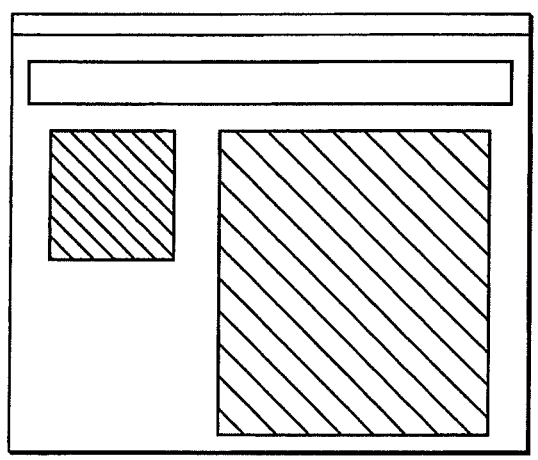
Figure 6C:
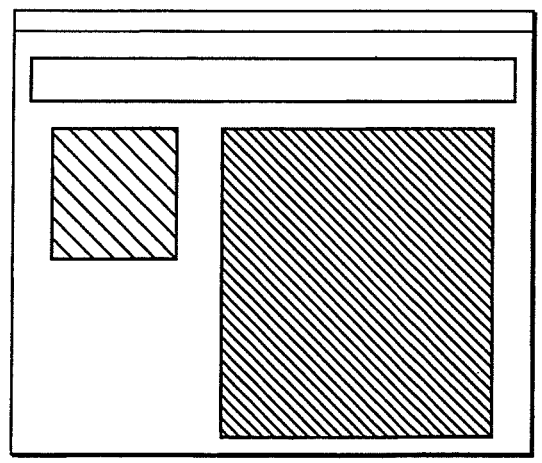
Figure 7A:
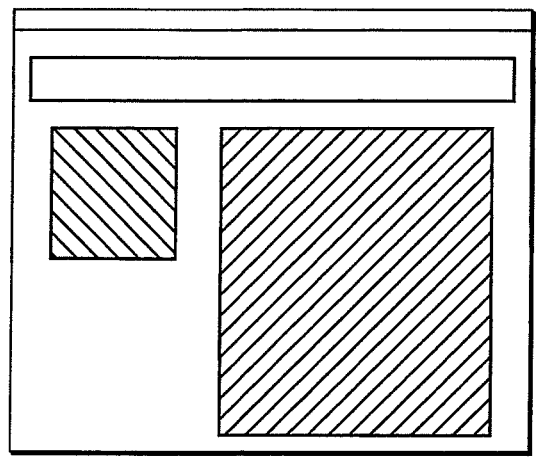
FIGS. 7A to 7C are views for explaining display control based on the first configuration example.
Figure 7B:
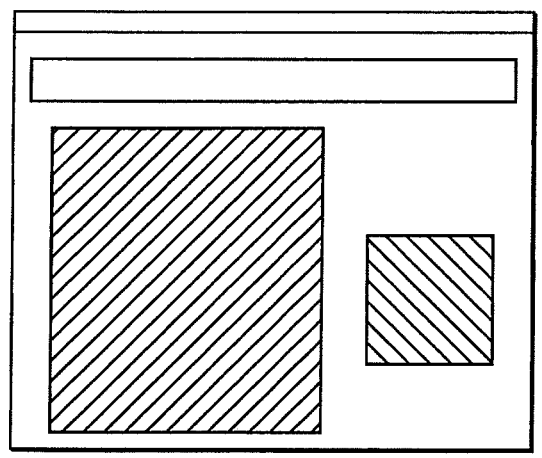
Figure 7C:
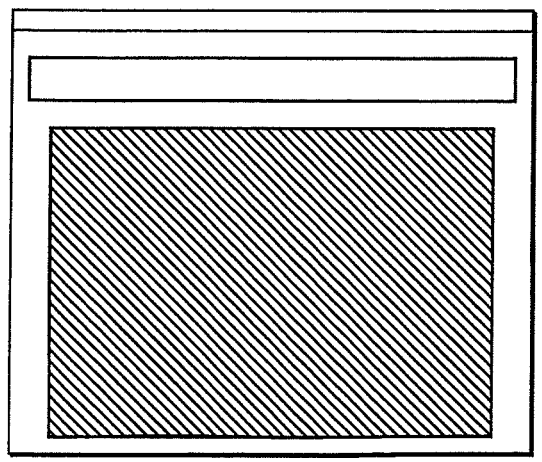
Figure 8A:
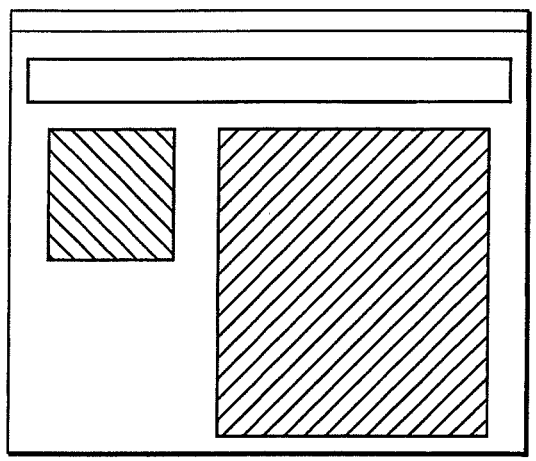
FIGS. 8A to 8C are views for explaining display control based on the first configuration example.
Figure 8B:
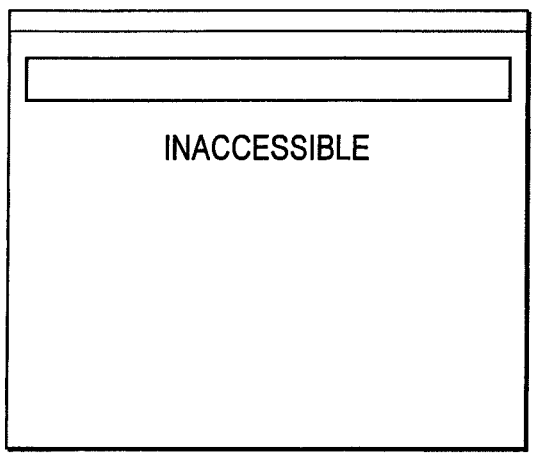
Figure 8C:
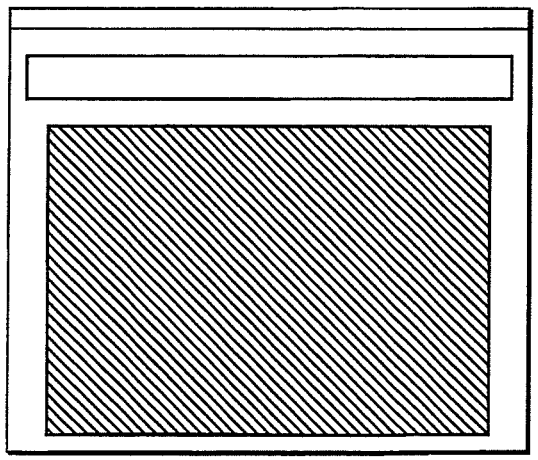

Processing executed by the comparison section 28 will be described more specifically. FIG. 4 is a diagram showing a first example of configuration of the comparison section 28. In this example, the comparison section 28 has an image comparison section 28a, and a page image creation section 28b. The page image creation section 28b creates image data indicating display contents of the respective seatmate's page information and image data indicating display contents of the first-person's page information. These image data are so-called raster type data composed of color information to be displayed on respective pixels. The image comparison section 28a compares the thus created image data with each other. That is, the image comparison section 28a compares the image data created based on the first-person's page information with the image data created based on the respective seatmate's page information. Then, the image comparison section 28a determines which part of an image indicated by the image data created based on the first-person's page information is included as the same contents and the same position in an image indicated by the image data created based on any seatmate's page information or which part of an image indicated by the image data created based on the first-person's page information is not included as the same contents and the same position in an image indicated by the image data created based on any seatmate's page information. The determination may be made in accordance with each pixel or may be made in accordance with each set of pixels. Alternatively, the determination may be made in accordance with each region surrounded by a frame. FIGS. 5A to 5C, FIGS. 6A to 6C, FIGS. 7A to 7C and FIGS. 8A to 8C show examples in which determination is made as to whether or not the same contents as those of an image indicated by image data created based on first-person's page information are included in the same position of an image indicated by image data created based on each seatmate's page information in accordance with each framed region of the image indicated by the image data created based on the first-person's page information, so that corrected image data are created in accordance with a result of the determination. Each of FIGS. 5A, 6A, 7A and 8A shows display contents indicated by first-person's page information. Each of FIGS. 5B, 6B, 7B and 8B shows display contents indicated by seatmate's page information corresponding to the same URL. Each of FIGS. 5C, 6C, 7C and 8C shows corrected display contents. As shown in FIGS. 5A to 5C, when display contents indicated by seatmate's page information are the same as display contents indicated by first-person's page information, corrected display contents, that is, display contents displayed on the screen of the computer and on the surface of projection are exactly the same as the display contents originally indicated by the first-person's page information. As shown in FIGS. 6A to 6C, when display contents indicated by seatmate's page information are partially different from display contents indicated by first-person's page information, corrected display contents are created so that the different part of the display contents indicated by the first-person's page information is replaced by an alternate image (represented by a meshed region in FIG. 6C). As shown in FIGS. 7A to 7C, when the layout of display contents indicated by seatmate's page information is different from the layout of display contents indicated by first-person's page information, corrected display contents are created so that all the display contents indicated by the first-person's page information are replaced by an alternate image. As shown in FIGS. 8A to 8C, when the communication control section 22 cannot access the URL of first-person's page information by using seatmate's account information, an error message is displayed in seatmate's page information. Also in this case, corrected display contents are created so that all the display contents indicated by the first-person's page information are replaced by an alternate image.

Figure 9:
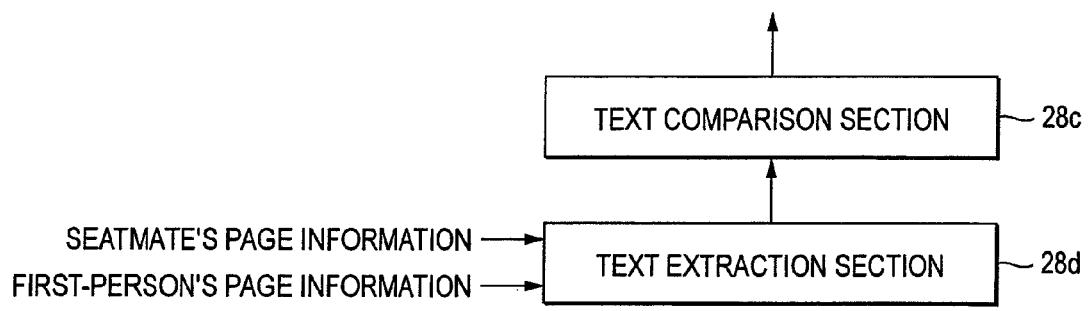
FIG. 9 is a diagram showing a second configuration example of the comparison section.
Figure 10A:
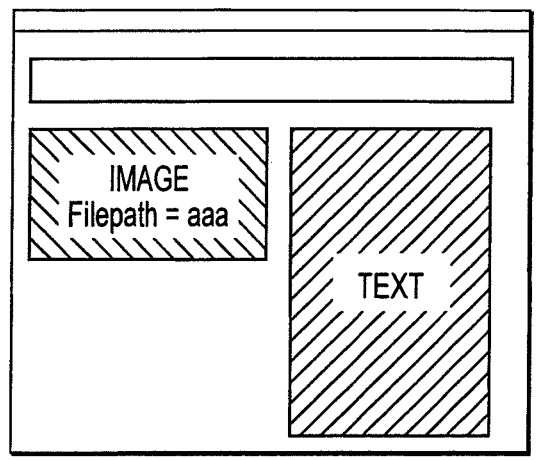
FIGS. 10A to 10C are views for explaining display control based on the second configuration example.
Figure 10B:
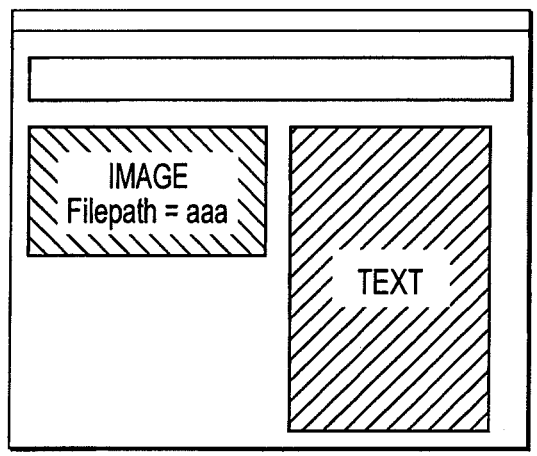
Figure 10C:
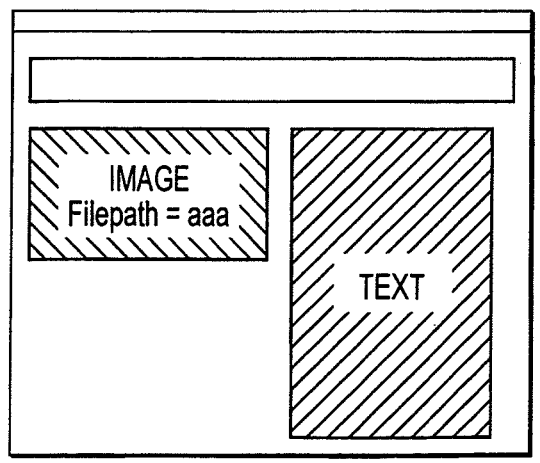
Figure 11A:
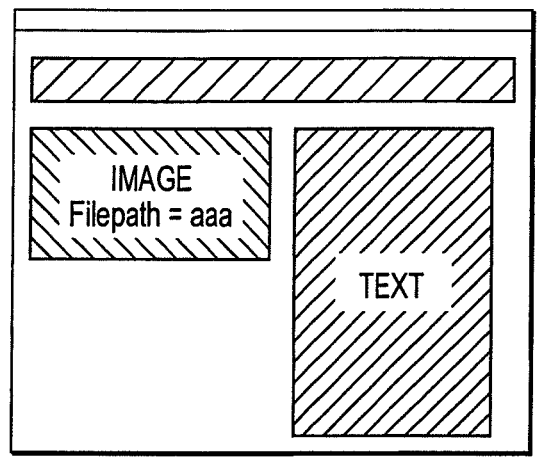
FIGS. 11A to 11C are views for explaining display control based on the second configuration example.
Figure 11B:
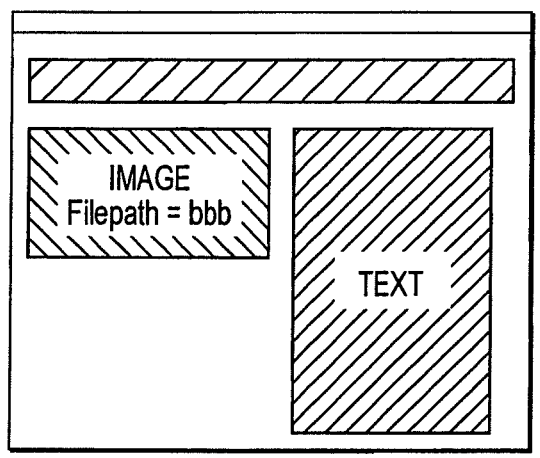
Figure 11C:
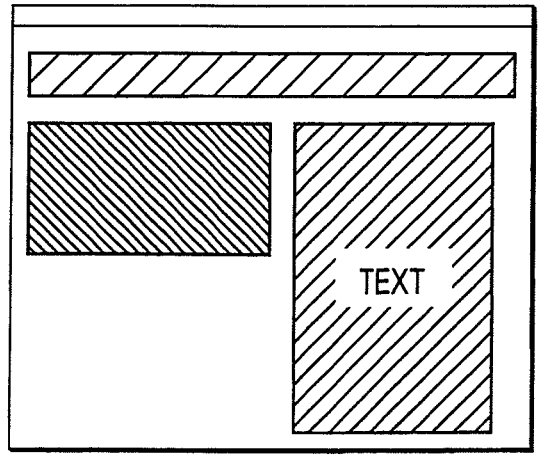
Figure 12A:
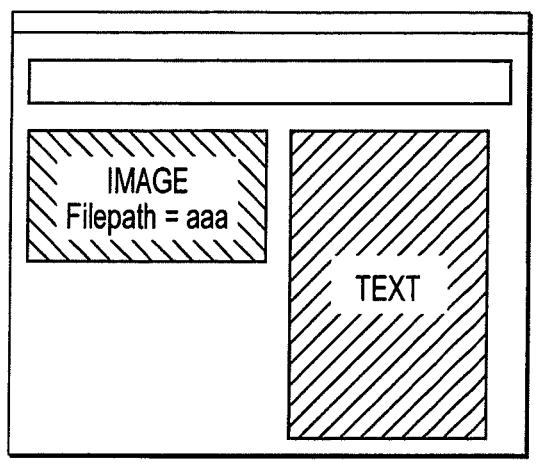
FIGS. 12A to 12C are views for explaining display control based on the second configuration example.
Figure 12B:
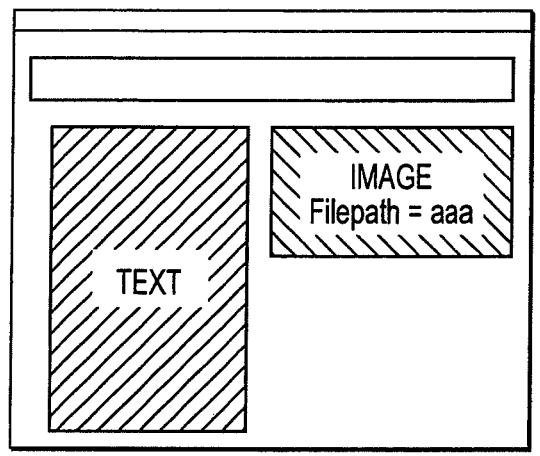
Figure 12C:
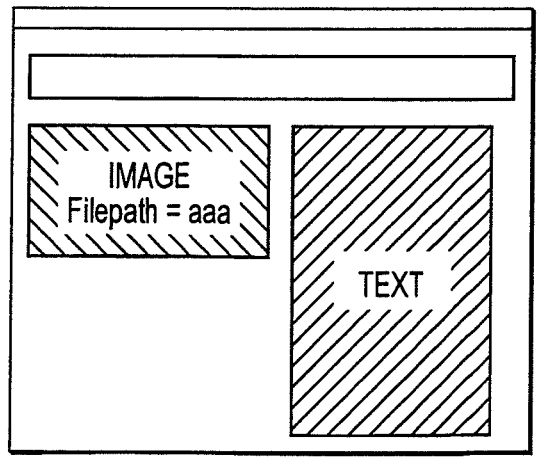
Figure 13A:
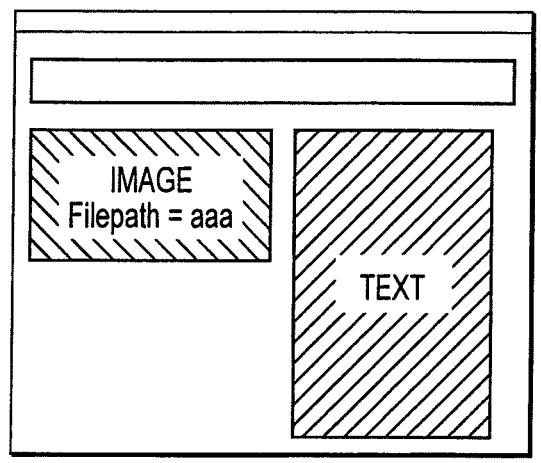
FIGS. 13A to 13C are views for explaining display control based on the second configuration example.
Figure 13B:
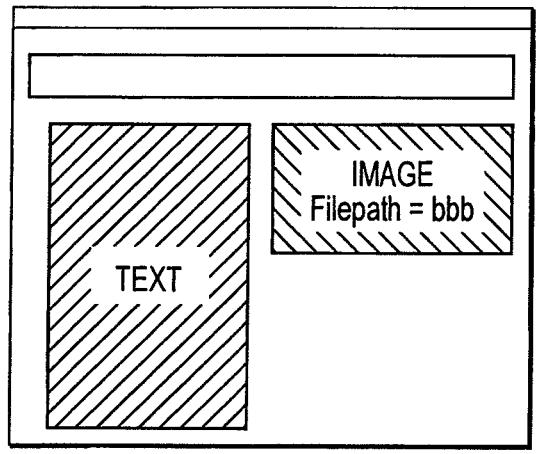
Figure 13C:
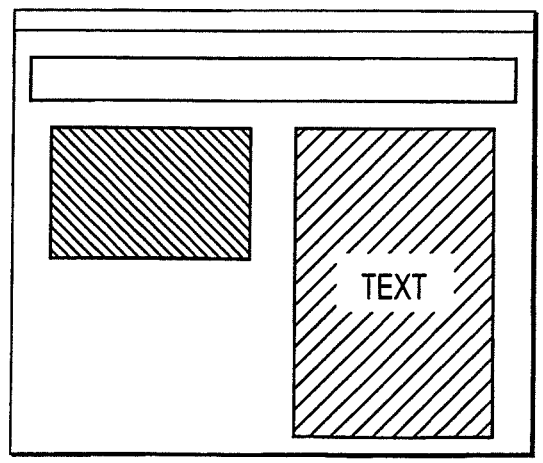

FIG. 9 is a diagram showing a second example of configuration of the comparison section 28. In this example, the comparison section 28 has a text extraction section 28d, and a text comparison section 28c. The text extraction section 28d extracts only text data indicating display contents from first-person's page information and seatmate's page information. The text comparison section 28c compares the text data extracted from the first-person's page information with the text data extracted from each seatmate's page information. Then, the text comparison section 28c determines which part of the text data extracted from the first-person's page information is included as the same contents in the text data extracted from any seatmate's page information or which part of the text data extracted from the first-person's page information is not included as the same contents in the text data extracted from any seatmate's page information. The determination may be made in accordance with each structural unit of a structured document such as each paragraph of text or each display region surrounded by a frame. FIGS. 10A to 10C, FIGS. 11A to 11C, FIGS. 12A to 12C and FIGS. 13A to 13C show examples in which determination is made as to whether or not the same contents as those of text data extracted from first-person's page information are included in text data extracted from each seatmate's page information in accordance with each text in each framed region of the text data extracted from the first-person's page information, so that corrected display contents are determined in accordance with a result of the determination. Each of FIGS. 10A, 11A, 12A and 13A shows display contents indicated by first-person's page information. Each of FIGS. 10B, 11B, 12B and 13B shows display contents indicated by seatmate's page information corresponding to the same URL. Each of FIGS. 10C, 11C, 12C and 13C shows corrected display contents. As shown in FIGS. 10A to 10C, when a text and a URL (path) of image data included in text data extracted from first-person's page information are included in text data extracted from seatmate's page information, corrected display contents are exactly the same as the display contents originally indicated by the first-person's page information. As shown in FIGS. 11A to 11C, when a text included in text data extracted from first-person's page information is included in text data extracted from seatmate's page information but an URL of image data is not included therein, corrected display contents include the original text but an alternate image is embedded in a region where the image data is originally displayed. As shown in FIGS. 12A to 12C, when the layout of display contents indicated by seatmate's page information is different from the layout of display contents indicated by first-person's page information but the same text and the same URL of image data as those in included in text data extracted from the first-person's page information are included in text data extracted from the seatmate's page information, corrected display contents are exactly the same as the display contents originally indicated by the first-person's page information. As shown in FIGS. 13A to 13C, the layout of display contents indicated by seatmate's page information is different from the layout of display contents indicated by first-person's page information and a URL of image data included in text data extracted from the first-person's page information is not included in text data extracted from the seatmate's page information, corrected display contents are created so that the image portion of the display contents originally indicated by the first-person's page information is replaced by an alternate image.

Figure 14:
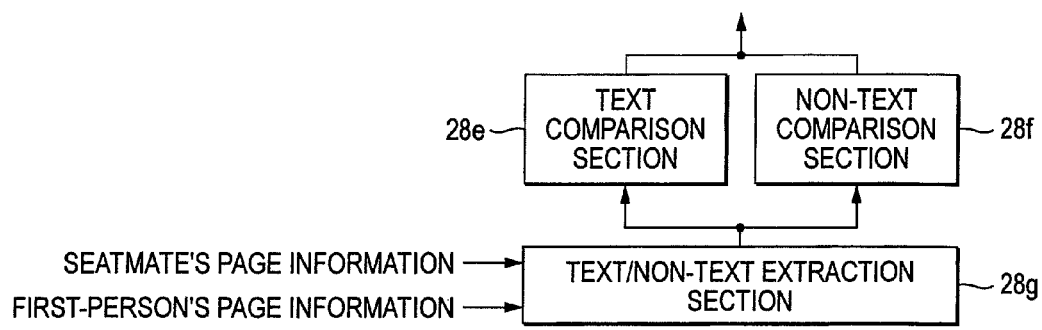
FIG. 14 is a diagram showing a third configuration example of the comparison section.
Figure 15A:
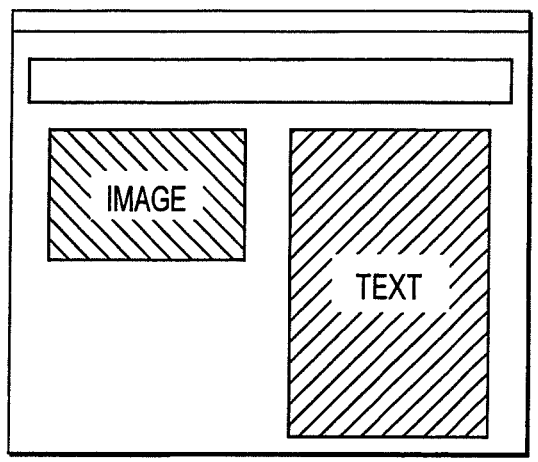
FIGS. 15A to 15C are views for explaining display control based on the third configuration example.
Figure 15B:
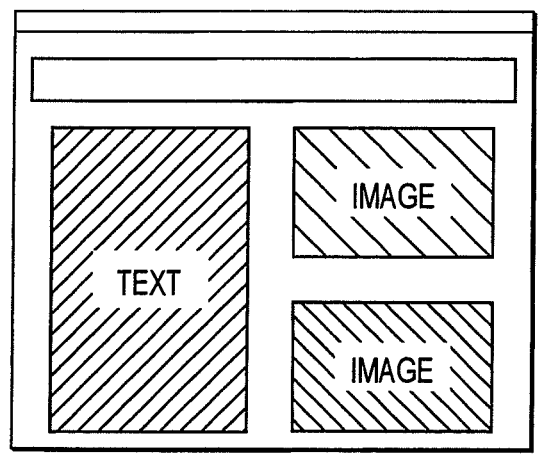
Figure 15C:
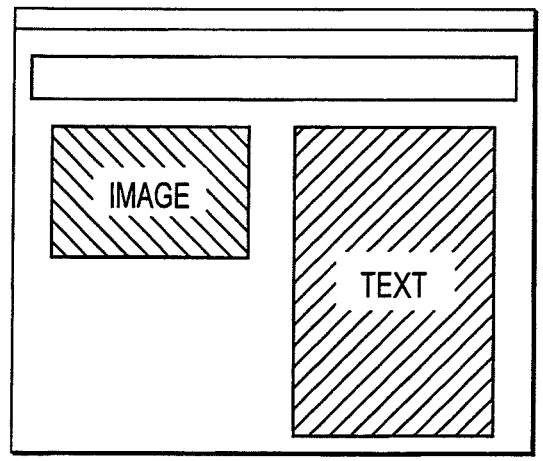
Figure 16A:
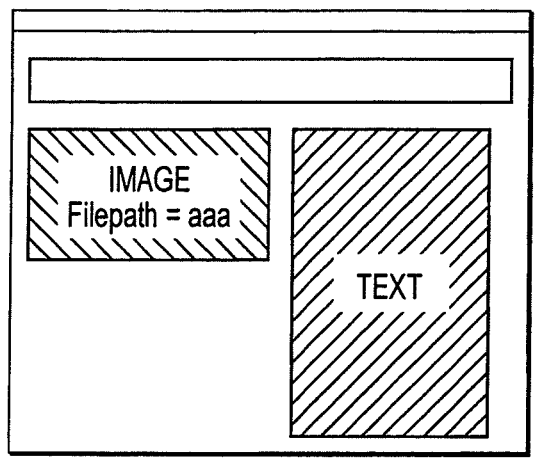
FIGS. 16A to 16C are views for explaining display control based on the third configuration example.
Figure 16B:
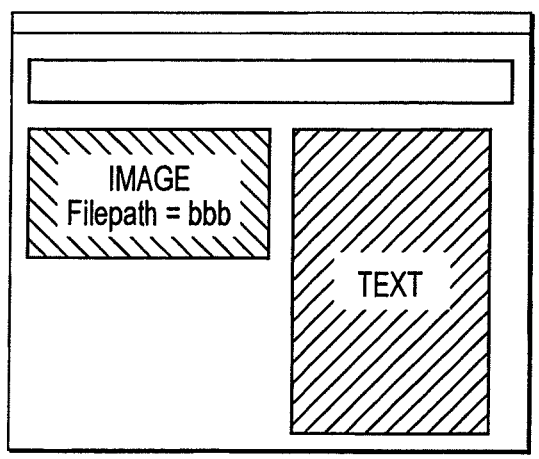
Figure 16C:
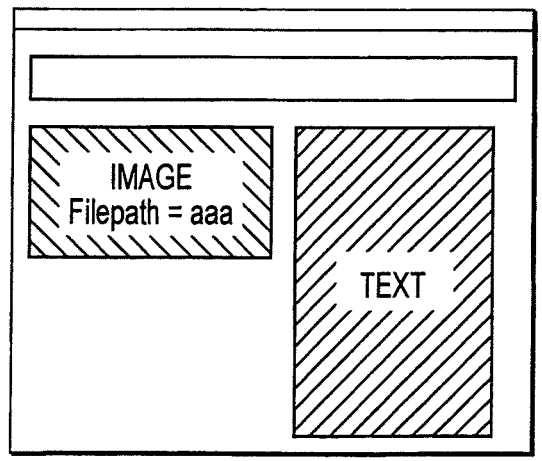

FIG. 14 shows a third example of configuration of the comparison section 28. In this example, the comparison section 28 has a text/non-text extraction section 28g, a text comparison section 28e, and a non-text comparison section 28f. The text/non-text extraction section 28g extracts text data and other data (non-text data) (specifically, image data) from first-person's page information and seatmate's page information while distinguishing the text data from the other data. The extracted text data is delivered to the text comparison section 28e, and the extracted non-text data is delivered to the non-text comparison section 28f. The text comparison section 28e determines whether or not the text extracted from the first-person's page information is included in the text extracted from the seatmate's page information in accordance with each predetermined range. The non-text comparison section 28f determines whether or not the same contents as those of each non-text data extracted from the first-person's page information are included in non-text data extracted from the seatmate's page information. The corrected first-person's page information creation section 26 creates corrected first-person's page information in such a manner that part of the text extracted from the first-person's page information but not included in the text extracted from the seatmate's page information is replaced by an alternate image and contents the same as those of the non-text data extracted from the first-person's page information but not included in the non-text data extracted from the seatmate's page information is replaced by an alternate image. FIGS. 15A to 15C and FIGS. 16A to 16C show examples in which determination is made as to whether or not the same contents as those of text data extracted from first-person's page information are included in text data extracted from each seatmate's page information in accordance with each text in each framed region of the text data, determination is further made as to whether or not the same contents as those of non-text data extracted from first-person's page information are included in non-text data extracted from each seatmate's page information in accordance with each text in each framed region of the non-text data, and corrected display contents are determined in accordance with results of these determinations. Each of FIGS. 15A and 16A shows display contents indicated by first-person's page information. Each of FIGS. 15B and 16B shows display contents indicated by seatmate's page information corresponding to the same URL. Each of FIGS. 15C and 16C shows corrected display contents. As shown in FIGS. 15A to 15C, when the layout of display contents indicated by first-person's page information is different from the layout of display contents indicated by seatmate's page information and an image not existing in the display contents indicated by the first-person's page information is included in the display contents indicated by the seatmate's page information but text and non-text data in each region extracted from the first-person's page information are included in text and non-text data extracted from the seatmate's page information, corrected display contents are the same as the display contents originally indicated by the first-person's page information. As shown in FIGS. 16A to 16C, when a URL of non-text data extracted from first-person's page information is different from a URL of corresponding non-text data extracted from seatmate's page information but contents of the non-text data are the same, corrected display contents are the same as the display contents originally indicated by the first-person's page information.

Figure 17:
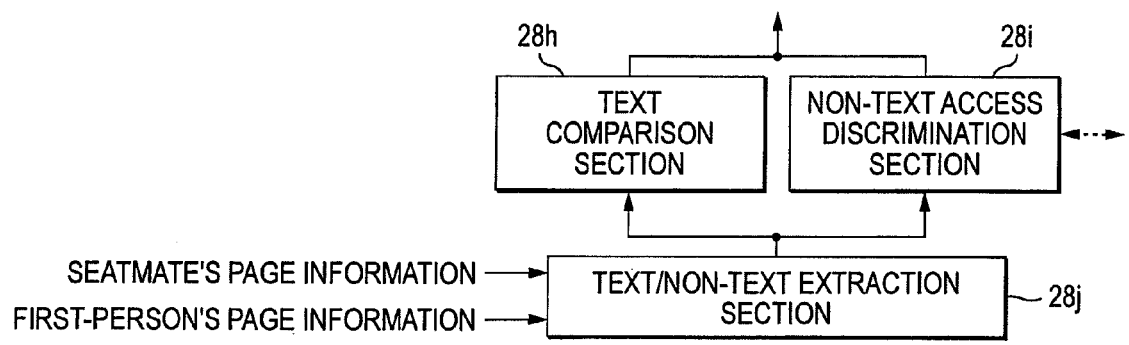
FIG. 17 is a diagram showing a fourth configuration example of the comparison section.
Figure 18A:
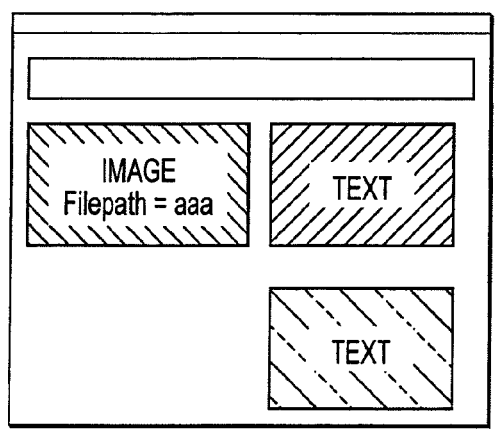
FIGS. 18A to 18D are views for explaining display control based on the fourth configuration example.
Figure 18B:
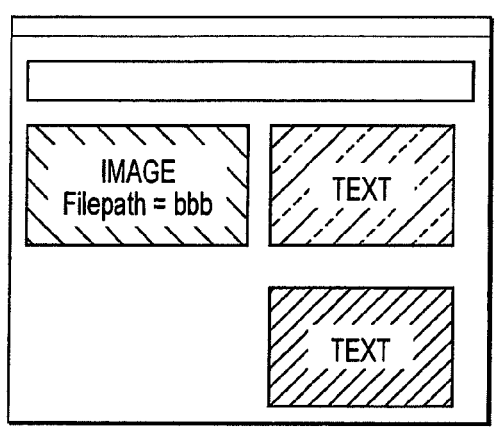
Figure 18C:
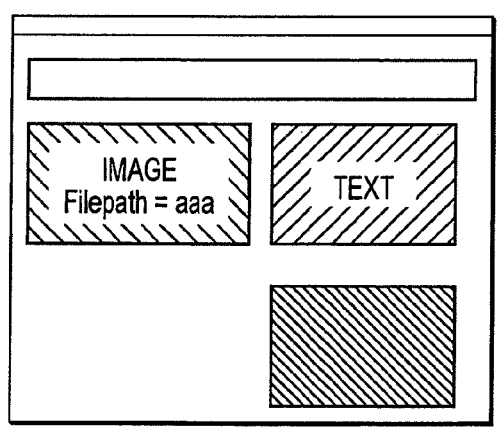
Figure 18D:
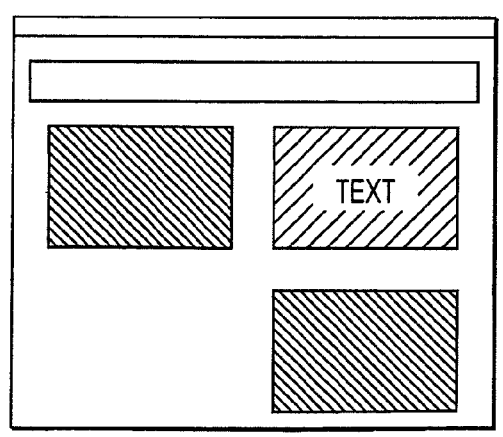

FIG. 17 shows a fourth example of configuration of the comparison section 28. In this example, the comparison section 28 has a text/non-text extraction section 28$j$, a text comparison section 28$h$, and a non-text access discrimination section 28$i$. The text/non-text extraction section 28$j$ extracts text data from first-person's page information and seatmate's page information. The text/non-text extraction section 28$j$ further extracts a URL of non-text data (image data) from the first-person's page information. The extracted text data is delivered to the text comparison section 28$h$, and the extracted URL of non-text data is delivered to the non-text access discrimination section 28$i$. The text comparison section 28$h$ determines whether or not the text extracted from the first-person's page information is included in the text extracted from the seatmate's page information in accordance with each predetermined range. The non-text access discrimination section 28$i$ accesses the URL extracted from the first-person's page information by using each seatmate's account information and determines whether non-text data can be acquired or not. The corrected first-person's page information creation section 26 creates corrected first-person's page information in such a manner that part of the text extracted from the first-person's page information but not included in the text extracted from the seatmate's page information is replaced by an alternate image and part of non-text data corresponding to the URL extracted from the first-person's page information but not accessible by use of the URL and the seatmate's account information is replaced by an alternate image. FIGS. 18A to 18D show an example in which determination is made as to whether or not the same contents as those of text data extracted from first-person's page information are included in text data extracted from each seatmate's page information in accordance with each text in each framed region of the text data, determination is further made as to whether or not non-text data corresponding to the URL extracted from the first-person's page information can be accessed by use of the seatmate's account information, and corrected display contents are determined in accordance with results of these determinations. FIG. 18A shows display contents indicated by first-person's page information. FIG. 18B shows display contents indicated by seatmate's page information corresponding to the same URL. FIG. 18C shows corrected display contents when non-text data can be accessed by use of the seatmate's account information. FIG. 18D shows corrected display contents when non-text data cannot be accessed by use of the seatmate's account information. As shown in FIGS. 18A and 18B, when part of text data extracted from first-person's page information is not included in text data extracted from seatmate's page information, the part is replaced by an alternate image. Assume now that the URL of non-text data extracted from first-person's page information is to be accessed by use of seatmate's account information. When the access succeeds, the original non-text is left in corrected display contents as shown in FIG. 18C. When the access fails, the original non-text in the corrected display contents is replaced by an alternate image, as shown in FIG. 18D.

Figure 19:
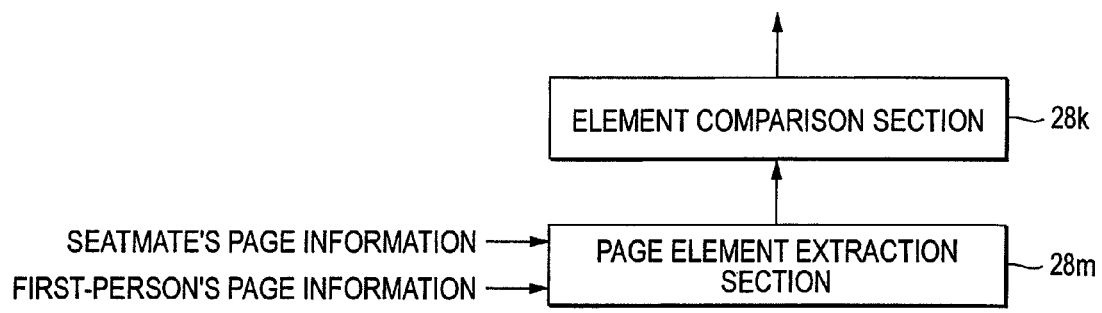
FIG. 19 is a diagram showing a fifth configuration example of the comparison section.
Figure 20A:
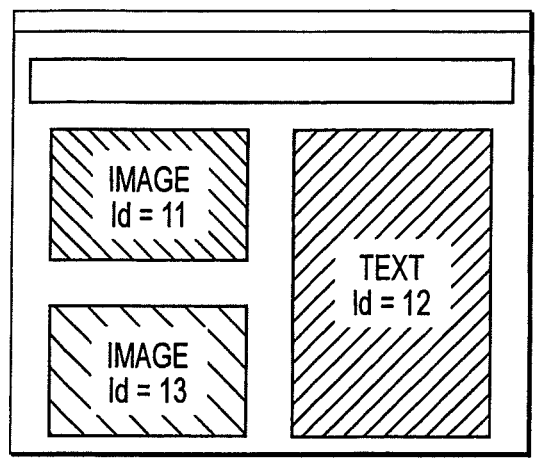
FIGS. 20A to 20C are views for explaining display control based on the fifth configuration example.
Figure 20B:
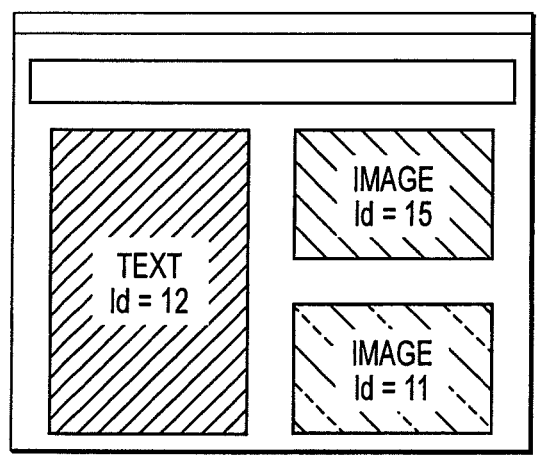
Figure 20C:
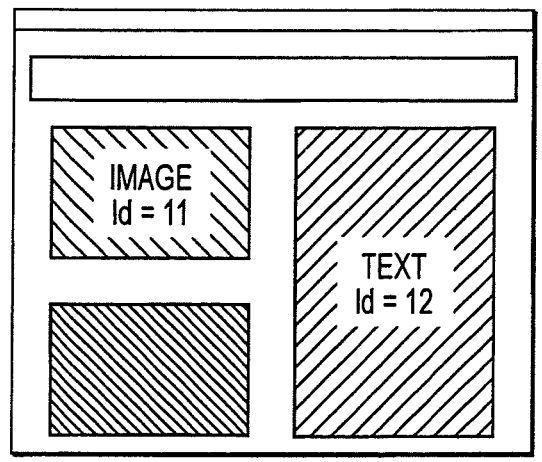

FIG. 19 shows a fifth example of configuration of the comparison section 28. In this example, the comparison section 28 has a page element extraction section 28$m$, and an element comparison section 28$k$. The page element extraction section 28$m$ extracts information (e.g. ID) for identifying each element or the like in each display unit such as a placeholder, a frame or a table, included in display contents indicated by first-person's page information and seatmate's page information, from the first-person's page information and the seatmate's page information. The element comparison section 28$k$ determines whether or not identification information extracted from first-person's page information is included in identification information extracted from seatmate's page information. When the identification information extracted from the first-person's page information is included in the identification information extracted from the seatmate's page information, the corrected first-person's page information creation section 26 creates corrected display contents so that the display unit identified by the identification information is included as it is in the corrected display contents. When the identification information extracted from the first-person's page information is not included as it is in the identification information extracted from the seatmate's page information, the corrected first-person's page information creation section 26 creates corrected display contents so that the display unit identified by the identification information is replaced by an alternate image. FIGS. 20A to 20C show processing in the fifth example of configuration. FIG. 20A shows display contents indicated by first-person's page information. FIG. 20B shows display contents indicated by seatmate's page information corresponding to the same URL. FIG. 20C shows corrected display contents. As shown in FIGS. 20A to 20C, when a display unit identified by the same identification information is included in display contents indicated by seatmate's page information, the display unit is included as it is in corrected display contents though contents of the display unit are different. When a display unit identified by the same identification information is not included in display contents indicated by seatmate's page information, the display unit in corrected display contents is replaced by an alternate image.

Figure 21:
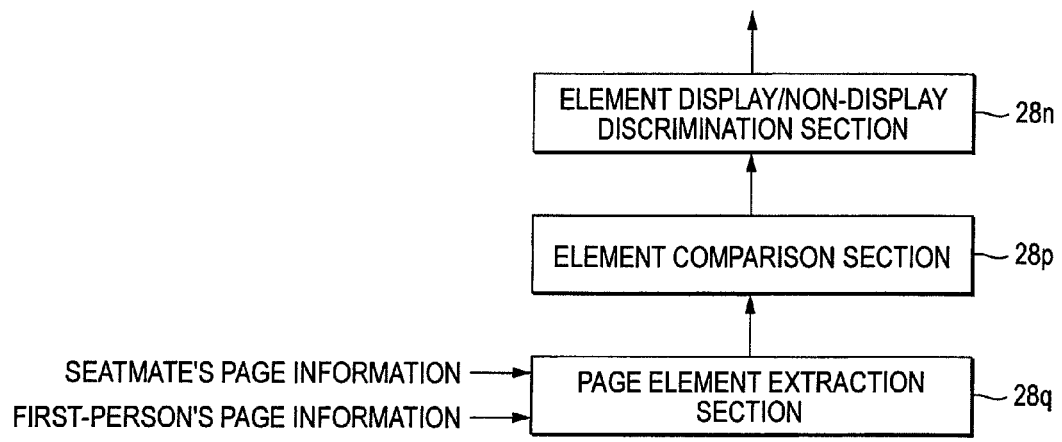
FIG. 21 is a diagram showing a sixth configuration example of the comparison section.
Figure 22A:
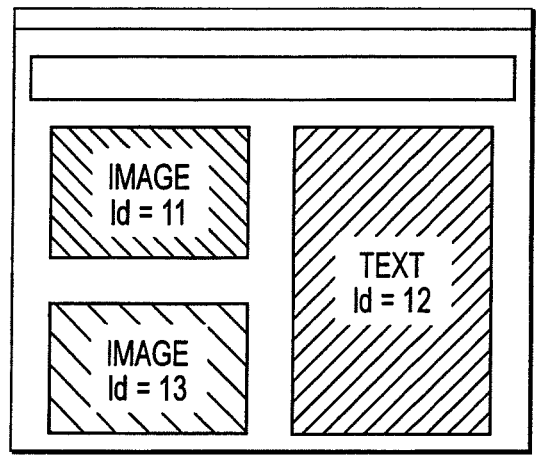
FIGS. 22A to 22C are views for explaining display control based on the sixth configuration example.
Figure 22B:
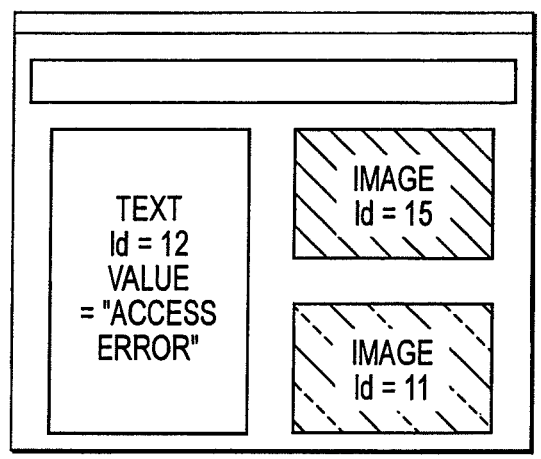
Figure 22C:
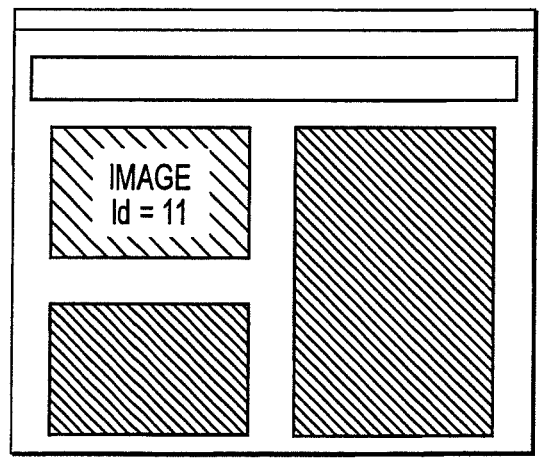

FIG. 21 shows a sixth example of configuration of the comparison section 28. In this example, the comparison section 28 has a page element extraction section 28$q$, an element comparison section 28$p$, and an element display/non-display discrimination section 28$n$. The page element extraction section 28$q$ extracts information (e.g. ID) for identifying each element or the like in each display unit such as a placeholder, a frame or a table, included in display contents indicated by first-person's page information and seatmate's page information, from the first-person's page information and the seatmate's page information. The element comparison section 28$p$ determines whether or not identification information extracted from first-person's page information is included in identification information extracted from seatmate's page information. When the identification information extracted from the first-person's page information is included in the identification information extracted from the seatmate's page information, the element display/non-display discrimination section 28$n$ determines whether access to contents indicated by the display unit identified by the identification information succeeds or fails. The corrected first-person's page information creation section 26 determines corrected display contents in accordance with results of these determinations. FIGS. 22A to 22C show processing in the sixth example of configuration. FIG. 22A shows display contents indicated by first-person's page information. FIG. 22B shows display contents indicated by seatmate's page information corresponding to the same URL. FIG. 22C shows corrected display contents. As shown in FIGS. 22A to 22C, when identification information extracted from first-person's page information is included in identification information extracted from seatmate's page information and access to contents indicated by the display unit identified by the identification information succeeds (regardless of the type of the contents), the portion of the display unit identified by the identification information in the display contents originally indicated by the first-person's page information is left in corrected display contents. On the other hand, when the access fails, the portion in the corrected display contents is replaced by an alternate image. When the identification information extracted from the first-person's page information is not included in the identification information extracted from the seatmate's page information, corrected display contents are created so that the portion of the display unit identified by the identification information is replaced by an alternate image.

Figure 23:
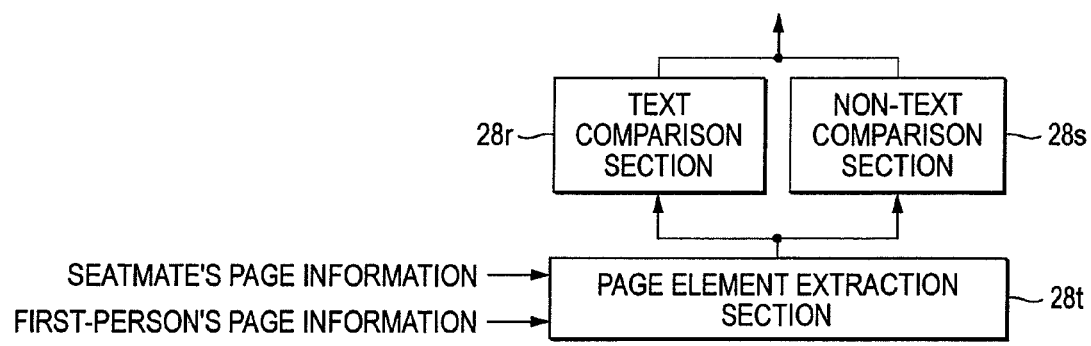
FIG. 23 is a diagram showing a seventh configuration example of the comparison section.
Figure 24A:
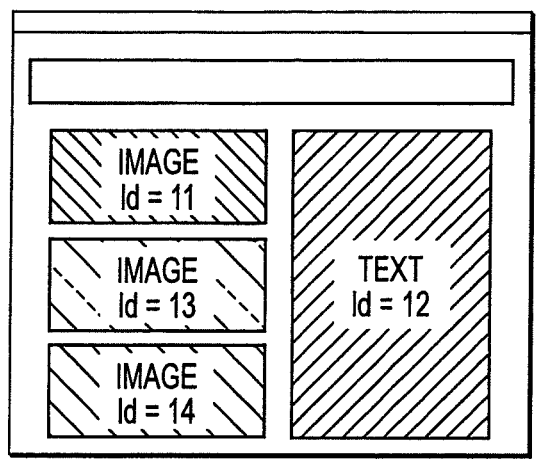
FIGS. 24A to 24C are views for explaining display control based on the seventh configuration example.
Figure 24B:
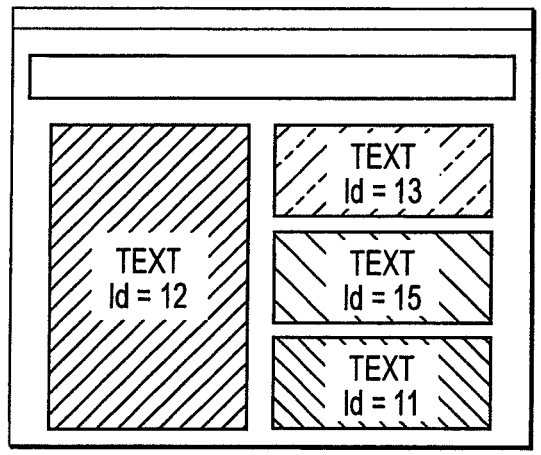
Figure 24C:
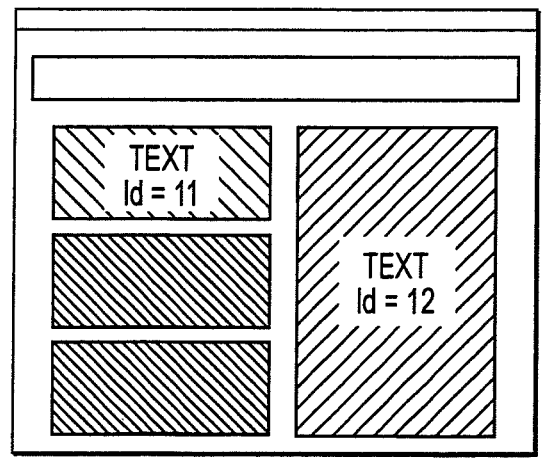

FIG. 23 shows a seventh example of configuration of the comparison section 28. In this example, the comparison section 28 has a page element extraction section 28$t$, a text comparison section 28$r$, and a non-text comparison section 28$s$. The page element extraction section 28$t$ extracts text data or non-text data (image data) indicated by display contents in accordance with each element in each display unit such as a placeholder, a frame or a table, included in display contents indicated by first-person's page information and seatmate's page information, from the first-person's page information and the seatmate's page information. The extracted text data is delivered to the text comparison section 28$r$, and the extracted non-text data is delivered to the non-text comparison section 28$s$. The text comparison section 28$r$ determines whether or not text data of each display unit extracted from first-person's page information is included in text data extracted from seatmate's page information. The non-text comparison section 28$s$ determines whether or not the same contents as those of non-text data of each display unit extracted from the first-person's page information are included in non-text data extracted from the seatmate's page information. When the same contents as those of text data or non-text data extracted from the first-person's page information are included in text data or non-text data extracted from the seatmate's page information, the corrected first-person's page information creation section 26 creates corrected display contents so that the text data or non-text data is left in the corrected display contents. On the other hand, when the same contents as those of text data or non-text data extracted from the first-person's page information are not included in text data or non-text data extracted from the seatmate's page information, the corrected first-person's page information creation section 26 creates corrected display contents so that an alternate image is embedded in a display unit corresponding to the text data or non-text data. FIGS. 24A to 24C show processing in the seventh example of configuration. FIG. 24A shows display contents indicated by first-person's page information. FIG. 24B shows display contents indicated by seatmate's page information corresponding to the same URL. FIG. 24C shows corrected display contents. As shown in FIGS. 24A to 24C, when text data or non-text data of each display unit extracted from first-person's page information is included in text data or non-text data of each display unit extracted from seatmate's page information, the contents of the display unit in display contents originally indicated by the first-person's page information are left in corrected display contents. On the other hand, when text data or non-text data of each display unit extracted from first-person's page information is not included in text data or non-text data of each display unit extracted from seatmate's page information, the contents of the display unit in corrected display contents is replaced by an alternate image.

Figure 25:
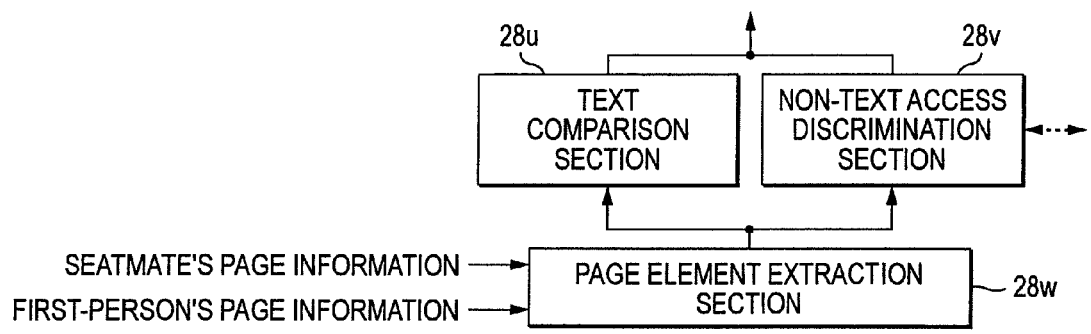
FIG. 25 is a diagram showing an eighth configuration example of the comparison section.
Figure 26A:
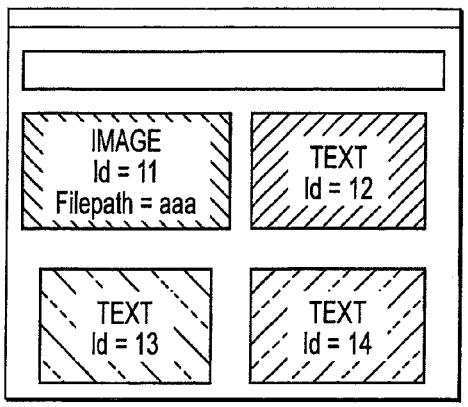
FIGS. 26A to 26D are views for explaining display control based on the eighth configuration example.
Figure 26B:
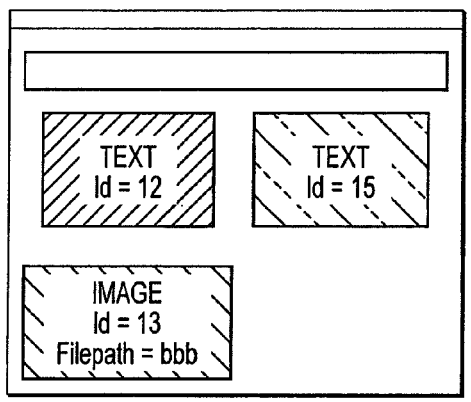
Figure 26C:
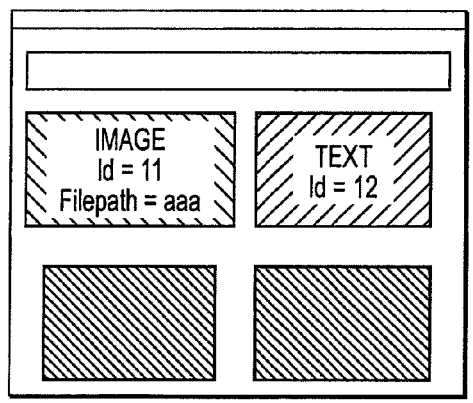
Figure 26D:
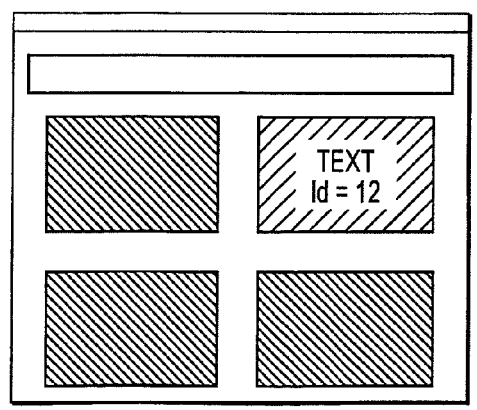

FIG. 25 shows an eighth example of configuration of the comparison section 28. In this example, the comparison section 28 has a page element extraction section 28$w$, a text comparison section 28$u$, and a non-text access discrimination section 28$v$. The page element extraction section 28$w$ extracts text data or a URL of non-text data (image data) indicated by display contents in accordance with each element in each display unit such as a placeholder, a frame or a table, included in display contents indicated by first-person's page information and seatmate's page information, from the first-person's page information and the seatmate's page information. The extracted text data is delivered to the text comparison section 28$u$, and the extracted URL of non-text data is delivered to the non-text access discrimination section 28$v$. The text comparison section 28$u$ determines whether or not text data of each display unit extracted from first-person's page information is included in text data extracted from seatmate's page information. The non-text access discrimination section 28$v$ determines whether or not the URL extracted from the first-person's page information can be accessed by use of seatmate's account information. The corrected first-person's page information creation section 26 determines corrected display contents in accordance with results of these determinations. FIGS. 26A to 26D show processing in the eighth example of configuration. FIG. 26A shows display contents indicated by first-person's page information. FIG. 26B shows display contents indicated by seatmate's page information corresponding to the same URL. FIG. 26C shows corrected display contents. As shown in FIGS. 26A to 26D, when text data of each display unit extracted from first-person's page information is included in text data of any display unit extracted from seatmate's page information, the contents of the display unit in display contents originally indicated by the first-person's page information are left in corrected display contents. On the other hand, when text data of each display unit extracted from first-person's page information is not included in text data of any display unit extracted from seatmate's page information, the contents of the display unit in corrected display contents is replaced by an alternate image. When the URL extracted from the seatmate's page information can be accessed, the contents of a display unit corresponding to the URL in display contents originally indicated by the first-person's page information are left in corrected display contents. On the other hand, when the URL cannot be accessed, the contents of the display unit in corrected display contents are replaced by an alternate image.

According to the aforementioned exemplary embodiment, display contents for a user A operating the computer 10 can be changed in accordance with display contents to be displayed for users B and C which are seatmates.

Incidentally, the invention is not limited to the aforementioned exemplary embodiment but various modifications may be made. Although the above description has been made in the case where the display control system according to the invention mainly has the computer 10 and a display control program executed by the computer 10 by way of example, it is a matter of course that part or all of the processing may be executed by another computer such as the Web server 14 on the network 16. It is a matter of course that, for example, a program may be executed by another computer on the network 16 in the same manner as described above, so that the computer can serve as a display information acquisition section which acquires corresponding display information provided to persons respectively, and as a display information creation section which creates display information indicating part or all of display contents indicated by display information provided to one of the persons and corresponding to display information provided to the one person and display information provided to other persons respectively.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control system comprising:
   a memory;
   a processor which is operable to configure:
   a display information acquisition section which, in response to receiving a first URL and first account information of a first user, acquires first web page information of the first URL acquired using the first account information, and which in response to receiving second account information of a second user, acquires second web page information of the first URL acquired using the second account information, wherein the first account information is different from the second account information;
   a comparison section which compares a display content of the first web page information with a display content of the second web page information;
   a determination section which, according to a result of the comparison, determines whether respective parts of the display content of the first web page information are the same as parts of the display content of the second web page information; and
   a corrected display information creation section which generates, according to a result of the determination, corrected display information in which parts of the display content of the first web page information that are not the same as parts of the display content of the second web page information are corrected so that said parts of the display content of the first web page information that are not the same parts of the display content of the second web page information are replaced with masking alternate image data which prevents the first and second user from understanding said parts of the display content of the first web page,
   wherein the display information acquisition section receives the first account information from a first log-in page and the second account information from a second log-in page, and
   wherein the first log-in page and the second log-in page are displayed on a single display.

2. The display control system according to claim 1, wherein
   the first web page information and the second web page information comprise a structured text, and
   wherein the comparison section (i) compares the display content of the first web page information with the display content of the second web page information based on each structure unit of the structured text of the first web page information and the second web page information, and (ii) selects part or all of the display content of the first web page information according to a result of the comparison.

3. The display control system according to claim 1, further comprising:
   an image creation section that creates a first image of display contents based on the first web page information and a second image of display contents based on the second web page information,
   wherein the comparison section compares the display content of the first web page information with the display content of the second web page information by comparing pixels between the first image and the second image.

4. The display control system according to claim 1,
   wherein the corrected display information creation section selects part or all of the display content of first web page information in accordance with a comparison between each part of the display content of the first web page information and a corresponding part of the display content of the second web page information.

5. The display control system according to claim 1,
   wherein the display information acquisition section acquires the second web page information whenever the display information acquisition section acquires the first web page information.

6. The display control system according to claim 1, further comprising:
   a display control section that controls a display section based on the corrected display information created by the corrected display information creation section so that display contents shown by the corrected display information are displayed on the display section; and
   an account information acceptance section that receives the first account information and the second account information,
   wherein the display information acquisition section acquires the first web page information based on the first account information received by the account information acceptance section, acquires the second web page information based on the second account information received by the account information acceptance section, and provides the first and second web page information to the corrected display information creation section.

7. The display control system according to claim 1, wherein the display information acquires, in response to receiving a second URL and the first account information of the first user, third web page information of the second URL acquired using the first account information and fourth web page information of the second URL acquired using the second account information so that the corrected display information creation section updates the corrected display information based on the third and fourth web page information.

8. A corrected display information output method comprising:
   acquiring, performed by a processor, first web page information of a first URL acquired using first account information, in response to receiving the first URL and the first account information of a first user, and second web page information of the first URL acquired using second account information in response to receiving second account information of a second user, wherein the first account information is different from the second account information;
   comparing a display content of the first web page information with a display content of the second web page information;

determining, according to a result of the comparing, whether respective parts of the display content of the first web page information are the same as parts of the display content of the second web page information; and in response to the determining, generating corrected display information in which parts of the display content of the first web page information that are not the same as parts of the display content of the second web page information are corrected so that said parts of the display content of the first web page information that are not the same parts of the display content of the second web page information are replaced with masking alternate image data which prevents the first and second user from understanding said parts of the display content of the first web page, wherein the first account information is received from a first log-in page and the second account information is received from a second log-in page, and wherein the first log-in page and second log-in page are displayed on a single display.

9. A non-transitory computer readable medium storing a program causing a computer to execute a process for controlling display information, the process comprising:

acquiring first web page information of a first URL acquired using first account information, in response to receiving the first URL and the first account information of a first user, and second web page information of the first URL acquired using second account information, in response to receiving second account information of a second user, wherein the first account information is different from the second account information;

comparing a display content of the first web page information with a display content of the second web page information;

determining, according to a result of the comparing, whether respective parts of the display content of the first web page information are the same as parts of the display content of the second web page information; and in response to the determining, generating corrected display information in which includes parts of the display content of the first web page information that are not the same as parts of the display content of the second web page information are corrected so that said parts of the display content of the first web page information that are not the same parts of the display content of the second web page information are replaced with masking alternate image data which prevents the first and second user from understanding said parts of the display content of the first web page, wherein the first account information is received from a first log-in page and the second account information is received from a second log-in page, and wherein the first log-in page and second log-in page are displayed on a single display.

* * * * *